US012553938B2

(12) United States Patent
Shi

(10) Patent No.: US 12,553,938 B2
(45) Date of Patent: Feb. 17, 2026

(54) DEVICES AND METHODS FOR TESTING OF THROUGH SILICON VIAS

(71) Applicant: SHANGHAI UNITED IMAGING MICROELECTRONICS TECHNOLOGY CO., LTD., Shanghai (CN)

(72) Inventor: Changzhi Shi, Shanghai (CN)

(73) Assignee: SHANGHAI UNITED IMAGING MICROELECTRONICS TECHNOLOGY CO., LTD., Shanghai (CN)

( * ) Notice: Subject to any disclaimer, the term of this patent is extended or adjusted under 35 U.S.C. 154(b) by 282 days.

(21) Appl. No.: 18/342,724

(22) Filed: Jun. 27, 2023

(65) Prior Publication Data

US 2023/0417825 A1    Dec. 28, 2023

(30) Foreign Application Priority Data

Jun. 27, 2022   (CN) .......................... 202210736906.4
Jun. 27, 2022   (CN) .......................... 202221624830.8

(51) Int. Cl.
*G01R 31/28*    (2006.01)
(52) U.S. Cl.
CPC ..... *G01R 31/2853* (2013.01); *G01R 31/2868* (2013.01); *G01R 31/2889* (2013.01)

(58) Field of Classification Search
CPC ............ G01R 31/2868; G01R 31/2856; G01R 31/2889; G01R 31/2853; G01R 31/2884
See application file for complete search history.

(56) References Cited

U.S. PATENT DOCUMENTS

| 2012/0097944 | A1 | 4/2012 | Lin et al. | |
| 2013/0057312 | A1 | 3/2013 | Pagani | |
| 2014/0208279 | A1* | 7/2014 | Bhawmik | G06F 30/30 |
| | | | | 716/106 |
| 2015/0115993 | A1* | 4/2015 | Wang | G01R 31/2851 |
| | | | | 257/48 |
| 2016/0258996 | A1* | 9/2016 | Lim | G01R 19/16533 |
| 2018/0226307 | A1 | 8/2018 | Pagani | |
| 2021/0088576 | A1* | 3/2021 | Lin | H01L 22/32 |

FOREIGN PATENT DOCUMENTS

| CN | 103630802 B | 2/2016 |
| CN | 205861845 U | 1/2017 |
| CN | 104752406 B | 10/2017 |

* cited by examiner

*Primary Examiner* — Eman A Alkafawi
*Assistant Examiner* — Suresh K Rajaputra
(74) *Attorney, Agent, or Firm* — METIS IP LLC

(57) ABSTRACT

The present disclosure provides a device, comprising: a substrate being provided with a through silicon via; at least one test assembly, each of the at least one test assembly including a surrounding structure, the surrounding structure being arranged around the through silicon via.

20 Claims, 11 Drawing Sheets

600 applying a preset voltage to the first test region and the second test region via the power supply ⸺ 610 after applying the preset voltage, obtaining a sidewall leakage current from the through silicon via to the second test region ⸺ 620

710 — applying the preset voltage to the first test region and the second test region through the power supply

720 — after applying the preset voltage to the first test region and one of multiple second test regions, obtaining a sidewall leakage current from the through silicon via to the second test region to which the preset voltage is applied

730 — obtaining a current result for the through silicon via based on a distance between each second test region and the through silicon via and the sidewall leakage current corresponding to each second test region

FIG. 7

DEVICES AND METHODS FOR TESTING OF THROUGH SILICON VIAS

CROSS-REFERENCE TO RELATED APPLICATIONS

This application claims priority of Chinese Patent Application No. 202210736906.4, filed on Jun. 27, 2022, and claims priority of Chinese Patent Application No. 202221624830.8, filed on Jun. 27, 2022, the contents of each of which are hereby incorporated by reference to its entirety.

TECHNICAL FIELD

The present disclosure relates to the field of semiconductor technology, and in particular to a device and a method for testing a through silicon via.

BACKGROUND

With the rapid development of semiconductor devices and integrated circuit technology, the size of chip components and process line width are constantly compressed, and the integration degree also follows Moore's law to continuously improve. As a result, three-dimensional integrated circuits and related three-dimensional interconnect and packaging techniques have emerged in recent years. One of the through silicon via (TSV) techniques is based on fusion bonding or hybrid bonding process to achieve multi-chip electrical interconnection in the vertical direction, therefore, the silicon via test structure to test whether the silicon via leakage is important to judge the performance of semiconductor chips.

Therefore, it is necessary to provide a device and a method for testing a through silicon via to achieve efficient and accurate testing of sidewall leakage current of a through silicon via.

SUMMARY

Through silicon via technology is based on fusion bonding or hybrid bonding process to realize the electrical interconnection of multiple chips in the vertical direction, which realizes the miniaturization of chip size. Therefore, using a device for testing a through silicon via to determine whether the through silicon via is leaking is important to judge the performance of semiconductor chips.

One or more embodiments of the present disclosure provide a device. The device may include a substrate being provided with a through silicon via; at least one test assembly, each of the at least one test assembly including a surrounding structure, the surrounding structure being arranged around the through silicon via.

In some embodiments, the test assembly may further include a test interface, the surrounding structure may include an opening structure, the first test interface may pass through the opening structure.

In some embodiments, a first side of the first substrate may include a first insulation layer; the surrounding structure may be provided in the first insulation layer and may be electrically connected with the first substrate at the first side.

In some embodiments, the first insulation layer may include a contact groove; the surrounding structure may include a conduction region, the conduction region being provided within the contact groove.

In some embodiments, a count of the test assemblies may be multiple, the multiple test assemblies may include at least two test assemblies, the at least two test assemblies corresponding to at least two surrounding structures being disposed at radial intervals in the first insulation layer.

In some embodiments, the at least two surrounding structures may be arranged coaxially around the through silicon via.

In some embodiments, a count of the test assemblies is multiple, the multiple test assemblies include at least two test assemblies, a difference in opening angles of any two of the at least two surrounding structures may be not greater than 30°.

In some embodiments, at least a portion of the at least two surrounding structures in the first insulation layer may differ in height along an axial direction of the through silicon via.

In some embodiments, among multiple surrounding structures with different heights along the axial direction of the through silicon via, a difference in opening angles between a surrounding structure with a larger radial dimension and a surrounding structure with a smaller radial dimension may be not greater than 5°.

In some embodiments, a maximum distance between the surrounding structure and the through silicon via may be between 25 μm and 500 μm.

In some embodiments, a distance between adjacent surrounding structures of the at least two surrounding structures along a radial direction of the through silicon via may be between 20 μm and 200 μm.

In some embodiments, a size of a cross-sectional area of one of the at least two surrounding structures may be positively correlated with a distance between the one of the at least two surrounding structures and the through silicon via.

In some embodiments, the at least two surrounding structures may have the same height; a radial width of one of the at least two surrounding structures may be positively correlated to the distance between the one of the at least two surrounding structures and the through silicon via.

In some embodiments, a height of one of the at least two surrounding structures may be positively correlated to the distance between the one of the at least two surrounding structures and the through silicon via.

In some embodiments, a radial width of the surrounding structure may be in a range of 1 μm to 100 μm.

In some embodiments, a second side of the first substrate may include a second insulation layer; the through silicon via may include a metal layer structure and a second test interface electrically connected with the metal layer structure; the metal layer structure may form a side wall of the through silicon via and penetrate the second insulation layer, the metal layer structure being electrically separated from the first substrate by a third insulation layer.

In some embodiments, the device may further include a second substrate and a metal chassis, the metal chassis being provided on an outside of the second insulation layer and being electrically connected with the metal layer structure.

One or more embodiments of the present disclosure provide a method implemented on a device, the device including a substrate being provided with a through silicon via and at least one test assembly, the test assembly including at least one surrounding structure, the surrounding structure arranged around the through silicon via. The method may include applying a voltage difference to the at least one test assembly and the through silicon via; obtaining a current result generated by the at least one test assembly and the through silicon via at the voltage difference; and determining at least one test result based on the current result.

In some embodiments, the at least one test assembly includes at least two test assemblies, and the at least one current result may include at least two current results generated by the at least two test assemblies and the through silicon via at the voltage difference. The determining at least one test result based on the current result may include determining a correspondence between a leakage current and a radial distance of the through silicon via based on the at least two current results. The correspondence between a leakage current and a radial distance of the through silicon via may be the test result.

The device and the method for testing a through silicon via described in some embodiments of the present disclosure not only achieve accurate testing of the sidewall leakage current of the through silicon via, but also can obtain the sidewall leakage current of the through silicon via as a function of the distance between the surrounding structure and the through silicon via, providing a more adequate parameter basis for the through silicon via and for the development of circuit layout design rules.

One or more embodiments of the present disclosure provide a system, comprising: at least one storage medium including a set of instructions; at least one processor in communication with the at least one storage medium, wherein when executing the set of instructions, the at least one processor is directed to cause the system to perform operations including: applying a voltage difference to at least one test assembly and a through silicon via on a substrate; obtaining a current result generated by the at least one test assembly and the through silicon via at the voltage difference; determining at least one test result based on the current result.

BRIEF DESCRIPTION OF THE DRAWINGS

The present disclosure is further illustrated in terms of exemplary embodiments. These exemplary embodiments are described in detail with reference to the drawings. These embodiments are not limited. In these embodiments, the same number represents the same structure, wherein:

FIG. 6 is a flowchart illustrating another exemplary process for testing a through silicon via according to some embodiments of the present disclosure;

FIG. 7 is a flowchart illustrating another exemplary process for testing a through silicon via according to some embodiments of the present disclosure;

Figure 1:
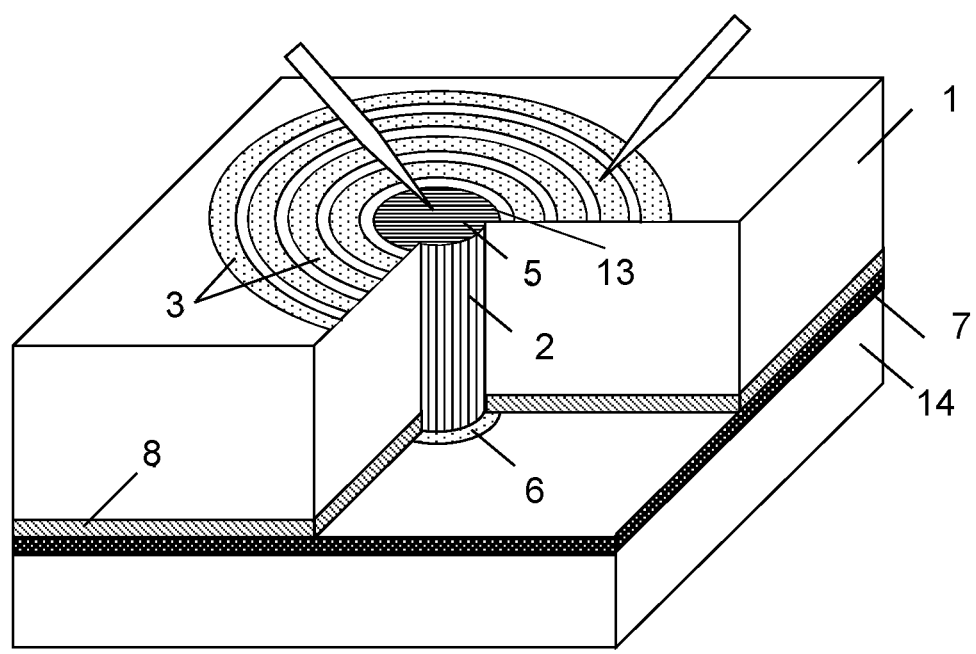
FIG. 1 is a schematic structural diagram illustrating a device for testing a through silicon via according to some embodiments of the present disclosure.

Description of the attached markings: 1, first substrate; 2, through silicon via; 3, surrounding structure; 4, first insulation layer; 5, metal conductor; 6, metal chassis; 7, fourth insulation layer; 8, second insulation layer; 9, contact groove; 10, first test interface; 11, first metal lead; 12, second test interface; 13, metal layer structure; 14, second substrate; 15, second metal lead; 16, lead contact groove.

DETAILED DESCRIPTION

The technical schemes of embodiments of the present disclosure will be more clearly described below, and the accompanying drawings need to be configured in the description of the embodiments will be briefly described below. Obviously, the drawings in the following description are merely some examples or embodiments of the present disclosure, and will be applied to other similar scenarios according to these accompanying drawings without paying creative labor. Unless obviously obtained from the context or the context illustrates otherwise, the same numeral in the drawings refers to the same structure or operation.

It should be understood that the "system", "device", "unit" and/or "module" used herein is a method for distinguishing different components, elements, components, parts or assemblies of different levels. However, if other words may achieve the same purpose, the words may be replaced by other expressions.

As shown in the present disclosure and claims, unless the context clearly prompts the exception, "a", "one", and/or "the" is not specifically singular, and the plural may be included. It will be further understood that the terms "comprise," "comprises," and/or "comprising," "include," "includes," and/or "including," when used in present disclosure, specify the presence of stated features, integers, steps, operations, elements, and/or components, but do not preclude the presence or addition of one or more other features, integers, steps, operations, elements, components, and/or groups thereof.

The flowcharts are used in present disclosure to illustrate the operations performed by the system according to the embodiment of the present disclosure. It should be understood that the preceding or following operations is not necessarily performed in order to accurately. Instead, the operations may be processed in reverse order or simultaneously. Moreover, one or more other operations may be added to the flowcharts. One or more operations may be removed from the flowcharts.

It should be noted that, for the sake of convenience, some embodiments of the present disclosure use a through silicon via to describe this type of device structure of "vertical conduction between chip to chip, wafer to wafer for interconnection between chips". But those skilled in the art should know that the material of some embodiments of the present disclosure is not limited to a silicon wafer. The shape of a through silicon via, doping, etc., is not limited. Any other device with through silicon via structure and function, such as germanium (Ge), gallium arsenide (GaAs), indium phosphide (InP), silicon carbide (SiC), gallium nitride (GaN), graphene materials, etc., may also be tested for through silicon via leakage current using processes for testing a through silicon via provided in some embodiments of the present disclosure.

Figure 2:
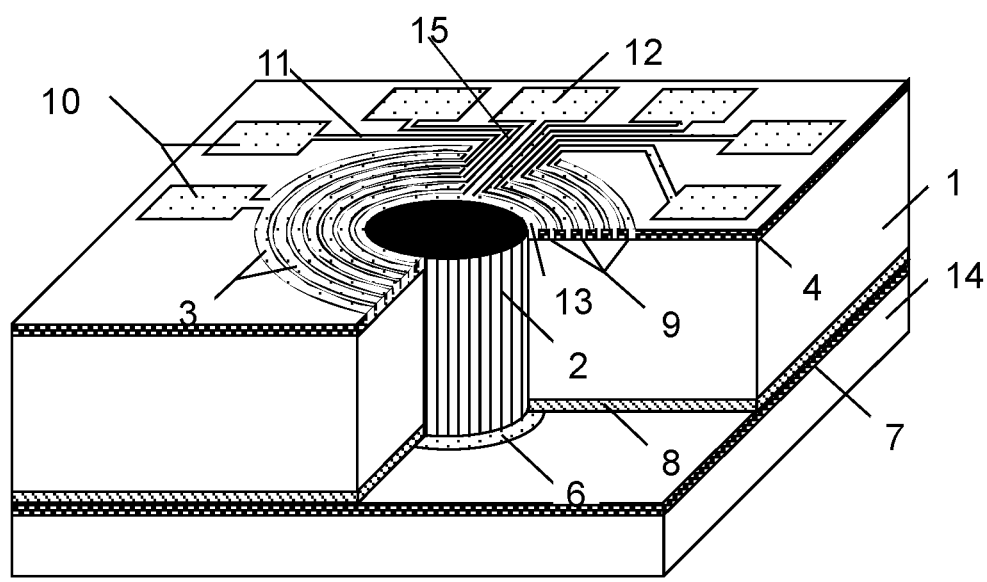
FIG. 2 is a schematic structural diagram illustrating a device for testing a through silicon via according to some embodiments of the present disclosure.
Figure 3:
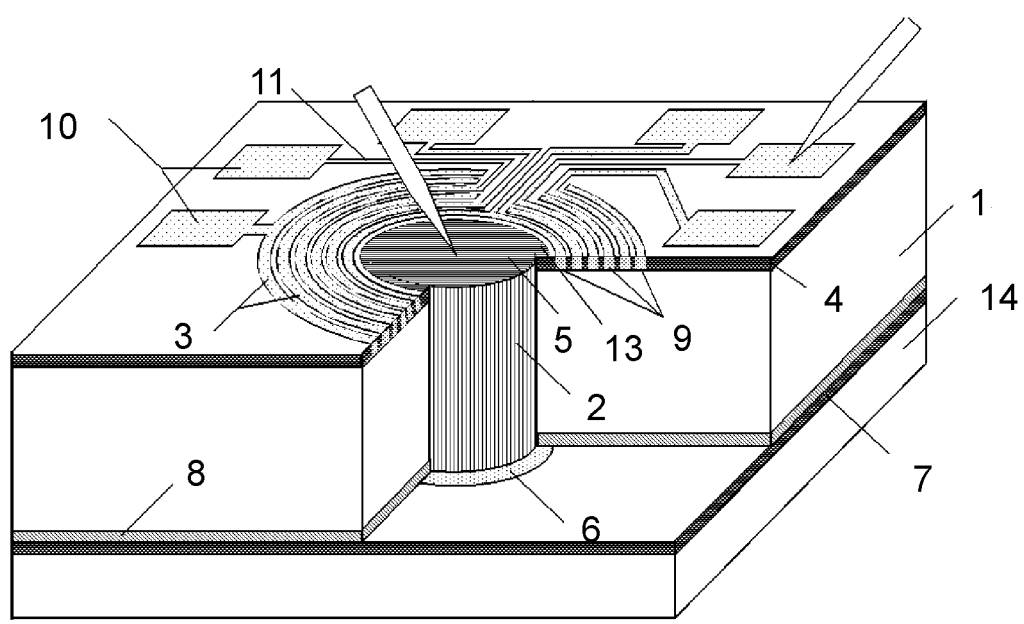
FIG. 3 is a schematic structural diagram illustrating a structure of a device for testing a through silicon via according to some embodiments of the present disclosure.
Figure 4:
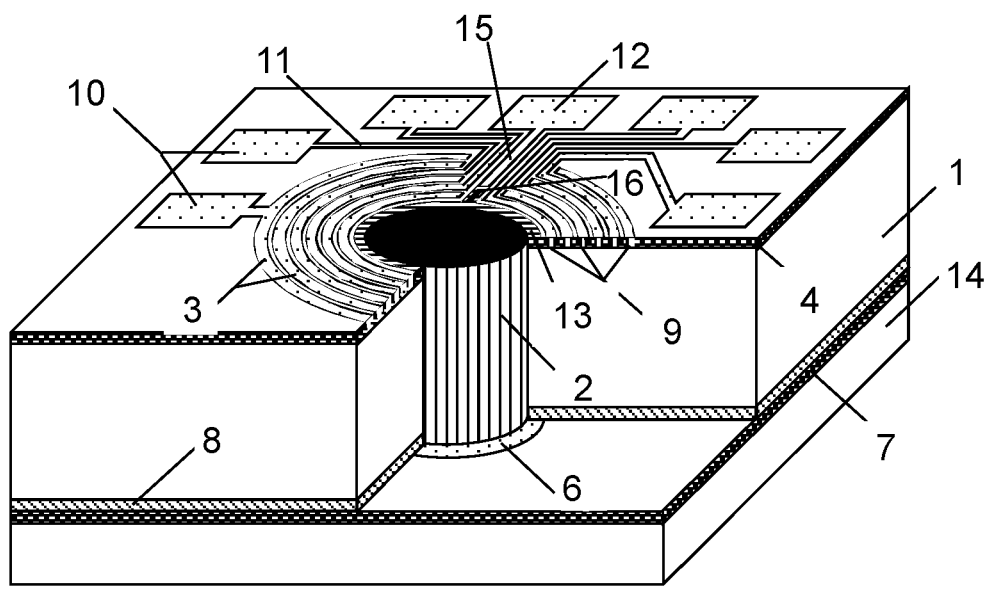
FIG. 4 is a schematic structural diagram illustrating a structure of a device for testing a through silicon via according to some embodiments of the present disclosure.

FIG. 1 is a schematic diagram illustrating a structure of a device for testing a through silicon via according to some embodiments of the present disclosure; FIG. 2 is a schematic diagram illustrating a structure of a device for testing a through silicon via according to some embodiments of the present disclosure; FIG. 3 is a schematic diagram illustrating a structure of a device for testing a through silicon via according to some embodiments of the present disclosure; FIG. 4 is a schematic diagram illustrating a structure of a device for testing a through silicon via according to some embodiments of the present disclosure. Some of the following embodiments may be understood with reference to FIGS. 1-FIG. 4, but the accompanying drawings are illustrative of only some of these embodiments and do not constitute a limitation on the embodiments.

As shown in FIGS. 1-FIG. 4, the device may include a first substrate 1 and at least one test assembly. The first substrate 1 may be provided with a through silicon via 2, and the test assembly may include a surrounding structure 3 arranged around the through silicon via 2.

The first substrate 1 may include a wafer substrate for semiconductor single crystal preparation. In some embodiments, the first substrate 1 may include or be provided with one or more through silicon vias.

The through silicon via 2 may be a through silicon via that needs to be tested for sidewall leakage current. The sidewall leakage current may also be referred to as leaking current or leakage current. The sidewall leakage current refers to the leakage current to ground of the through silicon via at a fixed bias. The size of the fixed bias may be a preset value.

The test assembly may be the assembly used to test the sidewall leakage current of the through silicon via. In some embodiments, a count of test assemblies may be one or more. In some embodiments, the one or more test assemblies may include a surrounding structure 3.

The surrounding structure 3 may be a structure arranged around the through silicon via 2.

In some embodiments, the surrounding structure 3 may be a closed structure. The width range of the surrounding structure 3 may be 20 μm-60 μm, which may accommodate a probe. The probe may detect the sidewall leakage current from the through silicon via 2 into the surrounding structure 3. For more information about this embodiment, please refer to the description of FIG. 1 below.

In some embodiments, the surrounding structure 3 may be an open structure that is used to lead out to a first test interface of the test assembly. The first test interface may detect the sidewall leakage current from the through silicon via 2 into the surrounding mechanism 3. For more information about this embodiment, please refer to the description of FIGS. 2-4 below.

In some embodiments, the surrounding structure 3 may be provided in the first substrate 1. For more information about this embodiment, please refer to the description of FIG. 1 below.

In some embodiments, the surrounding structure 3 may be provided in a first insulation layer 4 covering a surface on one side of the first substrate 1. For more information about this embodiment, please refer to the description of FIGS. 2-FIG. 4 below.

In some embodiments, in order to test the sidewall leakage current of the through silicon via 2 at different distances from the test assemblies, there may be multiple test assemblies, with different test assemblies at different distances from the through silicon via 2. In some embodiments, the multiple test assemblies may include at least two test assemblies, with the at least two test assemblies corresponding to at least two surrounding structures 3 disposed at radially intervals. The radial direction refers to a direction of a diameter or radius of the through silicon via 2.

In some embodiments, when the surrounding structure 3 is provided in the first substrate 1, the at least two surrounding structures 3 may be disposed at radial intervals on the first substrate 1. For more information about this embodiment, please refer to the description of FIG. 1 below.

In some embodiments, when the surrounding structure 3 is provided in the first insulation layer 4 of the first substrate 1, the at least two surrounding structures 3 may be disposed at radial intervals in the first insulation layer 4. For more information about this embodiment, please refer to the description of FIGS. 2-FIG. 4 below.

Referring to FIGS. 1-FIG. 4, in some embodiments, the at least two surrounding structures 3 may be arranged coaxially with the through silicon via 2 around an axis of the through silicon via 2. By arranging the at least two surround structures 3 coaxially, it is possible to facilitate accurate detection of the leakage level from a side wall of the through silicon via 2 to a region around the through silicon via 2 on the first substrate 1.

In some embodiments, a distance between adjacent surrounding structures 3 in the at least two surrounding structures 3 arranged along the radial direction may be between 20 μm and 200 μm. In some embodiments, the distance between the adjacent surrounding structures 3 in the at least two surrounding structures 3 of the at least two surrounding structures 3 along the radial direction may be between 20 μm and 180 μm. In some embodiments, the distance between the adjacent surrounding structures 3 in the at least two surrounding structures 3 along the radial direction may be between 40 μm and 160 μm. The distance may be a gap between two adjacent surrounding structures. When the surrounding structure is a structure having a width along the radial direction, the distance may be a distance between two adjacent sides of the two adjacent surrounding structures. The distance of the adjacent surrounding structures along the radial direction of the through silicon via may be varied depending on the process development, e.g., when the process development can accommodate a smaller distance, then the distance may be set to a smaller value, which is not limited herein.

By setting the distance between the adjacent surrounding structures, it effectively avoids the situation that the outermost surrounding structure cannot collect the sidewall leakage current due to the discrete distribution (i.e., when the distance is larger), so that the test curve may enter a smooth region sooner, while avoiding the poor electrical insulation effect between different surrounding structures due to the close distribution (i.e., when the distance is smaller).

Figure 10:
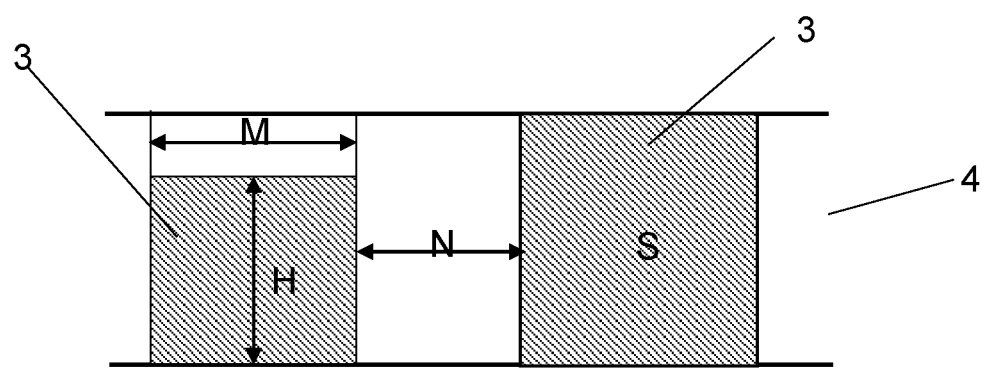
FIG. 10 is a cross-sectional view illustrating an exemplary surrounding structure and first substrate according to some embodiments of the present disclosure.

In some embodiments, a size of a cross-sectional area of each of the at least two surrounding structures 3 may be positively related to the distance between one of the surrounding structures 3 and the through silicon via 2. As shown in FIG. 10, symbol S is the cross-sectional area of the surrounding structure 3, symbol H is the height of the surrounding structure 3, symbol M is the radial width of the surrounding structure 3, and symbol N is the distance between the two surrounding structures 3.

When the through silicon via 2 is selected, the larger the diameter of the surrounding structure 3 is, the larger the distance between the one of the surrounding structures 3 and the through silicon via 2 is. According to the parasitic resistance equation $R=\rho \times L/S$ (where R is the parasitic impedance, $\rho$ is the conductor resistivity of the surrounding structure 3, L is the circumferential length of the surrounding structure 3, and S is the cross-sectional area of the surrounding structure 3), the larger the diameter of the surrounding structure 3 is, the larger the circumferential length of the surrounding structure 3 is, and the parasitic impedance of the surrounding structure 3 (or the conduction region) may increase, resulting in the smaller leakage current that can be collected from the surrounding structure 3 at a greater distance from the through silicon via 2. By setting the cross-sectional area of the surrounding structure 3 to be positively related to the distance between the one of the surrounding structures 3 and the through silicon via 2, it is possible that when the distance between the one of the surrounding structures 3 and the through silicon via 2 becomes larger (when the diameter of the surrounding structure 3 increases and the circumferential length of the surrounding structure 3 increases). By increasing the size of the cross-sectional area of the surrounding structure 3, the increase in parasitic impedance may be reduced, further improving the accuracy of the leakage current collected by the surrounding structure.

In some embodiments, the at least two surrounding structures may have the same height and the radial width of different surrounding structures 3 may be positively related to the distance between the one of the at least two surrounding structures 3 and the through silicon via 2. The height (also called axial height) of the surrounding structure 3 (e.g., height H) may be a length of the surrounding structure 3 along the axial direction. The radial width of the surrounding structure 3 may be a width of the surrounding structure 3 along a diameter direction of the through silicon via 2. The larger the distance between the one of the at least two surrounding structure 3 and the through silicon via 2 is, the larger the radial width of the surrounding structure 3 may be.

As the diameter of the surrounding structure 3 becomes larger, the circumferential length of the surrounding structure 3 increases, and the corresponding parasitic impedance of the surrounding structure 3 (or the lead-in area) may increase. By setting the radial width of the surrounding structure 3 to be positively related to the distance between the one of the at least two surrounding structures 3 and the through silicon via 2, the cross-sectional area of the surrounding structure 3 may be increased and the parasitic impedance may be reduced when the distance between the one of the at least two surrounding structures 3 and the through silicon via 2 becomes larger (at which time the diameter of the surrounding structure 3 increases and the circumferential length of the surrounding structure 3 increases) by increasing the radial width of the surrounding structure 3, which may increase the cross-sectional area of the surrounding structure 3 with the same height, reduce the magnitude of the increase in parasitic impedance and further improve the accuracy of the leakage current collected by the surrounding structure.

In some embodiments, the radial widths of the at least two surrounding structures 3 may be provided in the same width range. In this embodiment, the magnitude of the increase in parasitic impedance caused by a larger diameter of the surrounding structure 3 may be reduced by setting at least a portion of the at least two surrounding structures 3 to have different heights along the axial direction. In some embodiments, the height of the one of the at least two surrounding structures 3 may be positively related to the distance between the one of the at least two surrounding structures 3 and the through silicon via 2. For more information about this embodiment, please refer to FIG. 2 and its related description.

In some embodiments, the radial width of the surrounding structure may be in a range from 1 μm to 100 μm. In some embodiments, the radial width of the surrounding structure may be in a range from 1 μm to 60 μm. In some embodiments, the radial width of the surrounding structure may be in a range from 3 μm to 60 μm.

It should be noted that the radial width of the surrounding structure may be set according to the actual test requirements. For example, for a semiconductor substrate with low resistivity, the leakage current of the sidewall decays slowly during transmission, and a wider surrounding structure may test the leakage current from the through silicon via to the test region. In the case of a semiconductor substrate with high resistivity, the leakage current at the sidewall decays faster during transmission and the leakage current between the surrounding structure and the through silicon via may not be tested when using a wider surrounding structure, in which case the radial width of the surrounding structure may be set to a smaller value to meet the test requirements.

In some embodiments, a maximum distance between the one of the at least two surrounding structures 3 and the through silicon via 2 may be between 25 μm and 500 μm, the maximum distance refers to a distance between an outermost surrounding structure and the through silicon via. In some embodiments, the maximum distance between the one of the at least two surrounding structures 3 and the through silicon via 2 may be between 50 μm and 450 μm. In some embodiments, the maximum distance between the one of the at least two surrounding structures 3 and the through silicon via 2 may be between 60 μm and 400 μm. In some embodiments, the maximum distance between the one of the at least two surrounding structures 3 and the through silicon via 2 may be between 100 μm and 300 μm. The maximum distance between the one of the at least two surrounding structure 3 and the through silicon via 2 may be a distance between an inner ring edge of the at least two surrounding structures 3, which is at an outermost side, and a wall of the through silicon via 2. The maximum distance between the surrounding structure and the through silicon via may be varied depending on the process development, for example, when the process development can accommodate a smaller maximum distance, then the maximum distance may be set to a smaller value and the present disclosure is not limited here.

Since the sidewall leakage current of the through silicon via 2 is attenuated when it is transmitted in the first substrate, the further the distance from the through silicon via 2 is, the smaller the leakage current that can be collected by the surrounding structure 3 is. By setting the maximum distance between the one of the at least two surrounding structure 3 and the through silicon via 2, the accuracy of the leakage current collected by the outer surrounding structure 3 may be improved, and the situation that the sidewall leakage current cannot be collected when the surrounding structure 3 is too far away from the through silicon via 2 can be avoided.

In some embodiments, the maximum distance between the one of the at least two surrounding structures 3 and the through silicon via 2 may be related to the diameter of the through silicon via 2 and/or the performance of the through silicon via 2. For example, the greater the maximum distance between the one of the at least two surrounding structures 3 and the through silicon via 2 may be set to ensure that the radiation range of the leakage current is accurately tested when the sidewall passivation of the through silicon via 2 is poor.

Referring to FIGS. 1-FIG. 4, in some embodiments, a second side of the first substrate 1 may include a second insulation layer 8. The through silicon via 2 may include a metal layer structure 13 electrically connected with a second test interface. The metal layer structure 13 may form a side wall of the through silicon via 2 and penetrate the second insulation layer 8.

The second side may be a side of the first substrate 1 that is opposite the first side. The second side may also be referred to as a bottom surface of the first substrate 1. The side wall of the through silicon via 2 may be a circumferential side wall on the through silicon via 2 that is parallel to its axis, i.e., the hole wall. The first side is an upper surface of the first substrate 1. For more information about the first side, please refer to the following.

The second insulation layer 8 may be an insulation layer provided on the second side. The second insulation layer 8 may be used to prevent the leakage current of the through silicon via 2 from being absorbed by the first substrate 1, so that the leakage current cannot be tested. The second insulation layer 8 may be formed by depositing on the second side of the first substrate 1. For example, the insulation layer may be formed by depositing on the silicon substrate using processes such as atmospheric pressure chemical vapor deposition (APCVD), plasma enhanced chemical vapor deposition (PECVD), etc.

The metal layer structure 13 may be a component of the through silicon via 2. After a through-hole is opened in the first substrate 1, a third insulation layer may be made on a circumferential side wall of the through-hole, and then the third insulation layer is covered with the metal layer structure 13, thereby preparing the through-hole as the through silicon via 2. That is, the components of the side wall of the through silicon via 2 include the metal layer structure 13. The metal layer structure 13 may run through the second insulation layer 8, and the metal layer structure 13 may be electrically separated from the first substrate 1 by the third insulation layer.

In some embodiments, any region of the metal layer structure 13 may be used as a second test interface for detecting leakage currents.

The metal layer structure 13 may be connected with the first substrate 1 in different ways. Referring to FIG. 1, in some embodiments, there may be direct contact between the metal layer structure 13 and the first substrate 1.

In some embodiments, the metal layer structure 13 may be electrically separated from the first substrate 1 by the third insulation layer (not shown in the figure).

The third insulation layer may be an insulation layer provided between the metal layer structure 13 and the first substrate 1. The third insulation layer may be used to achieve electrical insulation between the through silicon via 2 and the first substrate 1.

In order to achieve the metal layer structure 13 and the electrical insulation from the first substrate 1, the third insulation layer needs to be deposited on the side wall of the through silicon via 2 before depositing the metal layer structure 13. The deposition may be formed in a similar way to the second insulation layer 8 and is not repeated here.

The second test interface may be an interface that is used to detect current.

The second test interface may be in various forms. In some embodiments, a metal conductor may be formed by filling the through silicon via 2 with metal, using the metal conductor as the second test interface. For more information about this embodiment, please refer to FIG. 1, FIG. 3 and their related descriptions. In some embodiments, the through silicon via 2 may be filled with metal to form a metal conductor leading through a metal lead and providing the second test interface. For more information about this embodiment, please refer to FIG. 2, FIG. 4 and their descriptions.

Referring to FIGS. 1-FIG. 4, in some embodiments, the device for testing a through silicon via may further include a second substrate 14 and a metal chassis 6. The metal chassis 6 may be provided on a surface of the second insulation layer 8 and electrically connected with the metal layer structure 13. For example, the metal chassis 6 may be provided with an outside of a lower side of the second insulation layer 8 and electrically connected with the metal layer structure 13. The lower side of the second insulation layer 8 may be a side close to a fourth insulation layer 7.

The second substrate 14 may be a substrate that provides support for the first substrate 1. In some embodiments, the second substrate 14 may be located below the first substrate 1. In some embodiments, the second substrate 14 may be a wafer bound to the first substrate 1 by electrostatic bonding.

In some embodiments, the metal chassis 6 may be provided on the outside of the second insulation layer 8 (i.e., the side of the second insulation layer 8 opposite the second side). In some embodiments, the metal chassis 6 may be provided on an upper surface of the second substrate 14. The upper surface of the second substrate 14 may be a side near the second side of the first substrate 1.

In some embodiments, the metal chassis 6 may be provided below the through silicon via 2, and one end of the through silicon via 2 is located within the metal chassis 6. In some embodiments, an edge region of the upper surface of the metal chassis 6 may be in contact with the second insulation layer 8. The upper surface of the metal chassis 6 is located on a side near the second side of the first substrate 1. A central region of the upper surface of the metal chassis 6 may be in contact with the through silicon via 2. In some embodiments, a diameter of the metal chassis 6 may be greater than or equal to a diameter of the through silicon via 2.

Referring to FIGS. 1-FIG. 4, in some embodiments, the second substrate 14 has a fourth insulation layer 7 deposited on the upper surface of the second substrate 14. The fourth insulation layer 7 may be an insulation layer provided on the upper surface of the second substrate 14. The edge region of the metal chassis 6 may be in contact with the fourth insulation layer 7, and the fourth insulation layer 7 may be used to achieve an electrical separation between the metal chassis 6 and the second substrate 14. In some embodiments, the upper surface of the second substrate 14 may be pre-deposited with the fourth insulation layer 7 that may form a silicon-oxygen bond electrostatically bonded. In some embodiments, the metal chassis 6 may be deposited on top of the fourth insulation layer 7.

Several exemplary devices for testing a through silicon via are described in detail below in conjunction with the accompanying drawings, and some of the following embodiments may be understood with reference to FIG. 1, but the accompanying drawings are only illustrative of some of these embodiments and do not constitute a limitation on the embodiments. As shown in FIG. 1, the through silicon via 2 may be filled with metal to form a metal conductor 5, which may be used as a second test interface. In this embodiment, the metal layer structure 13 may be an edge portion of the metal conductor 5.

As shown in FIG. 1, the surrounding structure 3 may be a closed structure. The surrounding structure 3 may be provided directly in the first substrate 1.

In some embodiments, the surrounding structure 3 may be in a variety of forms. In some embodiments, the surrounding structure 3 may be a ring, an arc, a semi-ring, a folded shape, or a polygon. In this embodiment, by setting the surrounding structure 3 as a ring, arc, semi-ring, folded shape or polygon, it is possible to set the surrounding structure 3 around the through silicon via 2, so that it is easy to collect the leakage current of the side wall of the through silicon via 2 in all directions toward the first substrate 1 and improve the accuracy of the sidewall leakage current obtained from the test while being applicable to different scenarios. For example, different scenarios may be those where the devices for testing a through silicon via are of different shapes.

In some embodiments, the surrounding structure 3 may be located in an annular recess region formed by etching on a first side of the first substrate 1. The first side is a side of the first substrate 1 that is perpendicular to an axial direction of the through silicon via 2.

In some embodiments, the surrounding structure 3 may be a metal conductor layer formed by filling the annular recess region etched in the first substrate 1 with metal, which forms an ohmic contact with the first substrate 1, and which may be used to test for the sidewall leakage current in the surrounding structure 3. By forming the metal conductor layer after filling the annular recess region etched in the first substrate 1 with metal, the sidewall leakage current on the surrounding structure 3 may be easily collected by a probe.

In some embodiments, at least a portion of at least two surrounding structures 3 in the first substrate 1 may have different heights along the axial direction, i.e., at least a portion of at least two annular recess regions have different etching depths. The axial direction in this context refers to an axial direction of the through silicon via 2.

In some embodiments, the at least two annular recess regions may be etched at different positions along the radial direction on the first substrate 1 such that the at least two surrounding structures 3 are disposed at radial intervals on the first substrate 1.

The radial width of the at least one of the two surrounding structures 3 in this embodiment may be 20 μm-60 μm, and the radial width may accommodate a probe inserted in the surrounding structure 3. It should be noted that the radial width of the one of the at least two surrounding structures 3 may be set according to the actual test requirements. For example, for a semiconductor substrate with a small resistivity, the sidewall leakage current decays more slowly during transmission, and a wider test region may be set to test the leakage current from the through silicon via to the test region. For a semiconductor substrate with a large resistivity, the sidewall leakage current decays faster during transmission, and a wider test region may not be able to test the leakage current between the test region and the through silicon via, which is farther away from the through silicon via. In this case, then the radial width of the test region may be set to a smaller value so as to meet the test requirements.

Referring to FIG. 1, a count of surrounding structures 3 may be more than 1, each surrounding structure 3 may have a different distance from the through silicon via 2. As shown in FIG. 1, there are four surrounding structures 3 illustrated in FIG. 1, and each surrounding structure 3 with a black dot shaded on top is provided around the through silicon via 2 at a different distance from the through silicon via 2.

In this embodiment, there can be no limitation on the count of surrounding structures 3 to be set. By setting more surrounding structures 3, the more accurate the relationship between the sidewall leakage current and the distance between the one of the at least two surrounding structures 3 and the through silicon via 2 may be obtained.

In this embodiment, each surrounding structure 3 may be co-circular and a distance between two adjacent surrounding structures 3 is within a distance range. In some embodiments, the distance range may be between 20 μm and 200 μm.

In this embodiment, by setting multiple surrounding structures 3 with different distances from the through silicon via 2, it is possible to test the relationship between the distance between different surrounding structures 3 and the through silicon via 2 and the leakage current corresponding to the distance, and then obtain the leakage current of the side wall of the through silicon via as a function of the distance between the test region and the through silicon via by fitting the relationship between the different distances and the leakage current corresponding to the distance, which can provide a more adequate parameter basis for the through silicon via and the circuit layout design rules.

In some embodiments, opening angle of the at least two opening structures on the at least two surrounding structures 3 may be the same or different. In some embodiments, the opening angles of the opening structures on the at least two surrounding structures 3 may be set to be the same when the at least two surrounding structures 3 have different axial heights. In some embodiments, the opening angles of the opening structures on the at least two surrounding structures 3 may be set to be different when the at least two surrounding structures 3 have the same axial height. In this embodiment, the setting angles of the opening structures on the at least two surrounding structures 3 remain the same. The same setting angle of the at least two opening structures means that a same side of the at least two opening structures is located on a same diameter line, which is a straight line in the radial direction of the through silicon via 2.

Referring to FIG. 1, in some embodiments, the through silicon via 2 may be filled with metal to form a metal conductor 5, which may serve as a second test interface electrically connected with an inside of the through silicon via 2 or its side walls, and the second test interface is electrically insulated from the first substrate 1.

In order to achieve the electrical connection between the silicon via 2 and the metal chassis 6, before filling the through silicon via 2 with metal, it is necessary to etch away a portion of the second insulation layer 8 corresponding to a bottom of the through silicon via 2 and retain the third insulation layer on the side wall; fill the through silicon via 2 with metal and deposit a metal layer on the surface of the first substrate 1 until the inside of the through silicon via 2 is completely filled, and after surface polishing, prepare the metal conductor 5 as an extended metal electrode for the through silicon via 2 (i.e., the second test interface).

When using the through silicon via test structure as shown in FIG. 1 to test the leakage current, a probe method may be used to test the leakage current, i.e., probe 1 and probe 2 are inserted on the metal conductor 5 for a total of 2 probes, and probe 3 and probe 4 are inserted on the same surrounding structure 3 for a total of 2 probes. The power supply used may be a direct current power supply, and the two ends of the direct current power supply are connected with probe 1 and probe 3 for applying a preset voltage difference, and two ends of a current detection device (e.g., an ammeter) are connected with probe 2 and probe 4 for collecting the sidewall leakage current. In some embodiments of the present disclosure, since the surrounding structure 3 is provided around the through silicon via 2, it is possible to collect the leakage current from the sidewall of the through silicon via 2 in all directions toward the first substrate 1 when the device for testing a through silicon via provided by the present embodiment is used, thereby enabling the accuracy of the leakage current tested by the device for testing a through silicon via to be improved. The leakage current refers to a leakage current to ground of the through silicon via at a fixed bias voltage. A size of the fixed bias voltage may be equal to a preset voltage.

Some of the following embodiments may be understood with reference to FIG. 2, but the accompanying drawings are only illustrative of some of these embodiments and do not constitute a limitation on the embodiments. The through silicon via test structure shown in FIG. 2 is similar to the through silicon via test structure shown in FIG. 1, with the difference that: the first side of the first substrate 1 of the through silicon via test structure shown in FIG. 2 includes a first insulation layer 4; the surrounding structure 3 is provided in the first insulation layer 4 and is electrically connected with the first substrate 1 at the first side. The side wall of the through silicon via 2 is deposited with a metal layer structure 13, and the inside of the through silicon via 2 is not filled with metal. The metal layer structure 13 is connected with the second test interface 12 via a second metal lead 15. The metal layer structure 13 is electrically separated from the first substrate by a third insulation layer (not shown in FIG. 2). As well, the test assembly further includes a first test interface 10 and the surrounding structure 3 includes an opening structure for leading out of the first test interface 10. The first test interface 10 is electrically connected with the surrounding structure 3 by means of a first metal lead 11.

The first test interface 10 refers to an interface for detecting a current condition of the surrounding structure 3. The first test interface 10 may be provided in the first side of the first substrate 1. One surrounding structure 3 and one first test interface 10 correspond.

A width of one of the at least two surrounding structures 3 in the through silicon via test structure illustrated in FIG. 2 may be 3 μm-30 μm. This width makes it difficult to align the probe due to its relatively small size, so the first test interface 10 may be located in a region outside the surrounding structure 3. The surrounding structure 3 and the first test interface 10 may be electrically connected by the first metal lead 11.

The first metal lead 11 may be led from the opening structure of the surrounding structure 3. One surrounding structure 3 may lead out of a set of first metal leads 11. Each surrounding structure 3 may be electrically connected with one first test interface 10 by a respective corresponding set of first metal leads 11. In some embodiments, orientations of opening structures of the multiple surrounding structures 3 may be the same.

Figure 11:
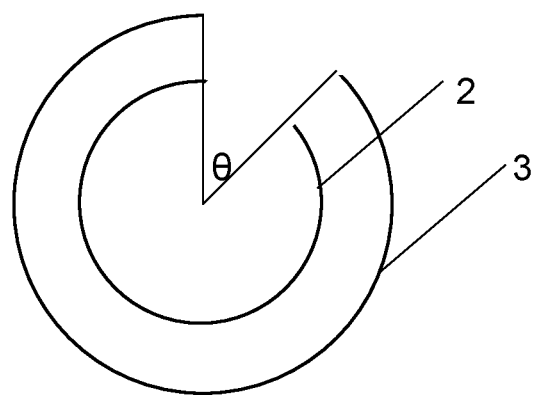
FIG. 11 is a top view illustrating an exemplary surrounding structure and a through silicon via according to some embodiments of the present disclosure.

It can be understood that the error of the collected leakage current is larger when the opening angle of the opening structure of the surrounding structure 3 is too large. In order to collect the leakage current from the sidewall of the through silicon via 2 in all directions towards the first substrate 1 and to improve the accuracy of the sidewall leakage current obtained from the test, the opening structure of the surrounding structure should not be too large. In some embodiments, the opening angle of the opening structure may be not greater than 30°. In some embodiments, the opening angle of the opening structure may be no greater than 20°. In some embodiments, the opening angle of the opening structure may be no greater than 10°. In some embodiments, the opening angle of the opening structure may be set according to actual needs, and the present disclosure does not limit this. The opening angle is an angle formed by a line between endpoints of ends of the opening structure and a center of the upper side of the through silicon via 2, the upper side of the through silicon via 2 being a side close to the first substrate. Referring to FIG. 11, θ is shown as the opening angle.

As shown in FIG. 2, in some embodiments, the first side of the first substrate 1 (also referred to as the upper surface) may include a first insulation layer 4, and the surrounding structure 3 may be provided in the first insulation layer 4 and may be electrically connected with the first substrate 1 at the first side.

In some embodiments, each of the at least two surrounding structures 3 may be disposed at intervals in the first insulation layer 4 on the first side of the first substrate 1.

The first insulation layer 4 may be an insulation layer provided on the first side of the first substrate 1. The first insulation layer 4 may cause an electrical isolation of the two adjacent surrounding structures 3 located outside the first side, and at the same time may support the at least two surrounding structures 3.

The first insulation layer 4 may be deposited to form on the first side of the first substrate 1. For example, the insulation layer may be deposited and formed on the silicon substrate using processes such as atmospheric pressure chemical vapor deposition (APCVD), plasma enhanced chemical vapor deposition (PECVD), etc.

In some embodiments, the first metal lead 11 may be electrically separated from the first substrate 1 by the first insulation layer 4. The first test interface 10 may be separated from the first substrate 1 by the first insulation layer 4.

In some embodiments, the first insulation layer 4 may include a contact groove 9, and the surrounding structure 3 may include a conduction region, and the conduction region is provided within the contact groove 9. Each surrounding structure 3 may be created by etching and depositing on the first insulation layer 4, for example, by etching off a portion of the first insulation layer 4 to form the contact groove 9, and depositing a metal layer on the contact groove 9 to form the conduction region of the surrounding structure 3. The etching may be done by dry etching, wet etching or other mechanical methods such as etching.

Referring to FIG. 2, in some embodiments, when a count of test assemblies is multiple, the multiple test assemblies may include at least two test assemblies, with the at least two test assemblies corresponding to the at least two surrounding structures 3 disposed at radial intervals in the first insulation layer 4. The radial direction refers to a direction perpendicular to the axis of the through silicon via.

As shown in FIG. 2, in some embodiments, the at least two surrounding structures 3 may have different distances from the through silicon via 2 in the first insulation layer 4. The at least two surrounding structures 3 may be arranged coaxially around the through silicon via 2, i.e., the at least two surrounding structures 3 may be co-circular.

In some embodiments, the count of test assemblies may be from 2 to 10 when the at least two test assemblies corresponding to the at least two surrounding structures 3 are provided in the first insulation layer 4 disposed at radial intervals. In some embodiments the count of test assemblies may be from 5 to 8.

In some embodiments, a difference in opening angles of any two of the at least two surrounding structures 3 may be not greater than 30°.

The difference in the opening angles of any two of the at least two surrounding structures 3 may be referred to as a first angular difference. The first angular difference may be related to axial heights (that is, height H) of the at least two surrounding structures 3. For example, when the axial heights of the at least two surrounding structures 3 are different, the first angular difference may be small and preferably may be 0. As another example, when the axial heights of the at least two surrounding structures 3 are the same, the first angular difference may be no greater than 30°.

In some embodiments, the first angular difference may be no greater than 25°. In some embodiments, the first angular difference may be no greater than 20°. The first angular difference may be set according to actual needs, and the present disclosure does not limit this. With this setting, it is possible to ensure that the surrounding angle of each surrounding structure 3 is as similar as possible, and to accurately collect the sidewall leakage current at different distances from the through silicon via 2 in relation to the distance.

In some embodiments, at least a portion of the at least two surrounding structures 3 may differ in axial height (e.g., height H) in the first insulation layer 4.

In some embodiments, the opening structures on the at least two surrounding structures 3 may be provided at different circumferential positions when at least a portion of the at least two surrounding structures 3 have different heights along the axial direction in the first insulation layer 4. In some embodiments, different axial heights of the surrounding structures 3 may be electrically connected with the first test interface 10 located on the first side by means of the first metal lead 11. In this embodiment, the first angular difference in the opening angles of any two of the at least two surrounding structures 3 may be small, preferably may be 0. The first metal leads 11 of the different surrounding structures 3 may be set at different axial heights, with no crossover between the different first metal leads 11. In some embodiments, the opening structures on the at least two surrounding structures 3 of different axial heights may be provided at any position on the surrounding structures 3. In some embodiments, the at least two opening structures on the at least two surrounding structures 3 of different axial heights may be provided staggered along the circumference (i.e., the individual opening structures are oriented differently). In some embodiments, opening angle sizes and/or circumferential dimension sizes of the at least two opening structures on the at least two surrounding structures 3 of different axial heights may be the same.

The above settings can solve the problem of inconsistent opening angle size of the opening structure of the inner and outer surrounding structure when located at the same axial height, and at the same time make the opening structure of each surrounding structure can be minimized, as well as achieve all-round leakage detection.

In some embodiments, at least a portion of the at least two surrounding structures 3 may have the same height along the axial direction in the first insulation layer. When the at least a portion of the at least two surrounding structures 3 have the same height in the first insulation layer 4 along the axial direction, the opening structures on the at least two surrounding structures 3 may be provided in a same circumferential position (i.e., the respective opening structures are oriented in the same direction). In some embodiments, the opening angles of the opening structures on the at least two surrounding structures 3 with the same circumferential position may be in a same range, circumferential sizes of the opening structures may be different, and the circumferential sizes of the opening structures on the at least two surrounding structures 3 with the same circumferential position follow the increase of the distance between the one of the at least two surrounding structures 3 and the through silicon via 2.

The above embodiment is set up to simplify the alignment and avoid causing electrical interference between the alignments.

It should be noted that the first metal lead 11 of the outermost surrounding structure 3 may be electrically connected with the corresponding first test interface 10 after leading from the opening structure, or it may be electrically connected with the corresponding first test interface 10 after leading from any position of the outermost surrounding structure 3. The first test interface 10 may be electrically separated from the first substrate 1 by the first insulation layer 4 on the first side of the first substrate 11.

In order to improve the ability of each surrounding structure to accurately capture leakage current in all directions, it is necessary to ensure that the opening angle and/or the circumferential size of the opening of each surrounding structure is as small as possible. In some embodiments, the difference between opening angles of a surrounding structure with a larger radial size and a surrounding structure with a smaller radial size (also referred to as a second angular difference) may be not greater than 5° among multiple surrounding structures with different heights along the axial direction. It should be understood that "larger" and "smaller" are relative concepts, and since the radial sizes of the multiple surrounding structures are different, any two surrounding structures may be selected to obtain a "surrounding structure with a larger radial size" and a "surrounding structure with a smaller radial size".

In some embodiments, the second angular difference may be no greater than 4°. In some embodiments, the second angular difference may be no greater than 3°. In some embodiments, the second angular difference may be no greater than 0° (which may be a negative number). The second angular difference may be set according to actual needs, and the present disclosure does not limit this. By this setting, it is possible to ensure that the surrounding angle of each surrounding structure 3 is as similar as possible, and to accurately collect the sidewall leakage current at different distances from the through silicon via 2 in relation to the distance.

In some embodiments, the heights of the at least two surrounding structures 3 may be positively correlated to the distance between the one of the at least two surrounding structures 3 and the through silicon via 2 when the heights of at least a portion of the at least two surrounding structures 3 differ along the axial direction in the first insulation layer 4. The greater the distance between the one of the at least two surrounding structures 3 and the through silicon via 2 is, the greater the height of the surrounding structure 3 is. In some embodiments, when at least a portion of the at least two surrounding structures 3 differ in height along the axial direction in the first insulation layer 4, there may not be a specific relationship between the height of the at least two surrounding structures 3 and the distance between the one of the at least two surrounding structures 3 and the through silicon via 2.

The magnitude of the increase in parasitic impedance caused by a larger diameter of the surrounding structure 3 may be reduced by setting at least a portion of the at least two surrounding structures 3 with different heights along the axial direction.

Referring to FIG. 2, in some embodiments, the metal layer structure 13 may be electrically connected with the second test interface 12 via a second metal lead 15 for detecting leakage current. For more information about the metal layer structure 13, please refer to the related description above.

In some embodiments, the contact groove 9 may be obtained by etching on the insulation layer deposited on the first substrate 1 (i.e. the first insulation layer 4), and thus the surrounding structure 3 may be prepared. In some embodiments, the first metal lead 11, the second metal lead 15, the first test interface 10, the second test interface 12 may be prepared on the insulation layer (i.e. the first insulation layer 4) deposited on the first substrate 1. In some embodiments, a passivation layer may be overlaid after preparation of the first metal lead 11, the second metal lead 15, the first test interface 10, the second test interface 12. When contacting the first test interface 10, the second test interface 12, a contact window may be etched into the passivation layer.

In some embodiments, when using the device for testing a through silicon via shown in FIG. 2 and testing the leakage current from the through silicon via 2 to a certain surrounding structure 3 using the 4-probe process, probe 1 and probe 2 may be inserted on the first test interface 10 corresponding to that surrounding structure 3 or directly on the surrounding structure 3, and probe 3 and probe 4 may be inserted on the second test interface 12 electrically connected with the metal layer structure 13. Thereby, the leakage current from the through silicon via to this surrounding structure 3 may be tested by the 4-probe process. If the width of the metal layer structure 13 is wide enough, it is also possible to insert probe 3 and probe 4 directly on the metal layer structure 13 to test the leakage current from the through silicon via to the surrounding structure 3.

It should be noted that an exemplary preparation process for the device for testing a through-hole illustrated in FIG. 2 above is shown below:

The fourth insulation layer 7 is obtained by pre-deposition on the upper surface of the second substrate 14 and the metal chassis 6 is prepared outside the second insulation layer 8. A wafer binding between the second substrate 14 and the first substrate 1 is achieved by electrostatic bonding between the fourth insulation layer 7 and the second insulation layer 8 via a silicon-oxygen bond. The second insulation layer 8 may be obtained by deposition in a similar manner on the second side of the first substrate 1. After bonding, one side of the first substrate 1 may be thinned to a target depth for deep silicon etching of the through silicon via by processes such as thinning, grinding, and chemical mechanical polishing. In some embodiments, the thinned thickness of the first substrate 1 may be 10 μm-300 μm. Then, the first insulation layer 4 is deposited on the upper surface of the first substrate 1, the contact groove 9 for the concentric ring-shaped transmission line electrodes is etched in the first insulation layer 4, and the surrounding structure 3 is prepared. A deep silicon etching process in through silicon via technology may be used to process the through silicon via 2 in the first substrate 1. In order to achieve electrical insulation of the metal layer structure 13 of the through silicon via 2 from the first substrate 1, a third insulation layer needs to be deposited on the sidewall of the through silicon via 2 before depositing the metal layer structure 13 of the through silicon via 2. In order to achieve the electrical connection between the through silicon via 2 and the metal chassis 6, the second insulation layer 8 at the bottom of the through silicon via 2 needs to be removed by etching and the third insulation layer on the sidewall needs to be retained before depositing the metal layer in the through silicon via 2; the metal layer structure 13 is electrically connected with the second test interface 12 through a metal lead (such as the second metal lead 15), which is electrically connected with the probe by the second test interface 12. The first insulation layer 4 on the surrounding structure 3 may be etched off to prepare the surrounding structure 3.

Some of the following embodiments may be understood with reference to FIG. 3, but the accompanying drawings are only illustrative of some of these embodiments and do not constitute a limitation on the embodiments. The through silicon via test structure shown in FIG. 3 is similar to the through silicon via test structure shown in FIG. 2, with the difference that the through silicon via 2 shown in FIG. 3 has metal deposited inside it, and the metal conductor 5 may be formed when the inside of the through silicon via 2 is filled with metal. This metal conductor 5 may serve directly as a second test interface and the metal layer structure 13 may be electrically connected with the metal chassis 6.

In some embodiments, the diameter of the through silicon via may be 3-30 μm. In employing the device for testing a through silicon via shown in FIG. 3 and testing the leakage current from the through silicon via 2 to a certain surrounding structure 3 using the 4-probe process, probe 1 and probe 2 may be inserted on the first test interface 10 corresponding to that surrounding structure, and probe 3 and probe 4 may be inserted directly on the metal conductor 5 formed inside the through silicon via (in this case, the metal conductor 5 may be used as a second test interface), thereby testing the leakage current of the through silicon via.

It should be noted that an exemplary preparation process for the device for testing a through silicon via illustrated in FIG. 3 above is, for example, as follows:

The fourth insulation layer 7 is obtained by pre-deposition on the upper surface of the second substrate 14 and the metal chassis 6 is prepared outside the second insulation layer 8. The wafer binding between the second substrate 14 and the first substrate 1 is achieved by electrostatic bonding between the fourth insulation layer 7 and the second insulation layer 8 via a silicon-oxygen bond. The first insulation layer 4 may be obtained by depositing in a similar manner on the second side of the first substrate 1. The second substrate 14 may be wafer bound to the first substrate 1 by electrostatic bonding. After bonding, one side of the first substrate 1 may be thinned to a target depth of the through silicon via deep silicon etching by thinning, grinding, chemical mechanical polishing and other processes, and the thinned thickness of the first substrate 1 in this embodiment may be 10 μm-300 μm. Then, a contact groove 9 of a concentric ring-shaped transmission line electrode may be etched on the first insulation layer 4 deposited on the surface of the first substrate 1 to prepare the surrounding structure 3. In some embodiments, the first metal lead 11, the first test interface 10, may be prepared on the insulation layer (i.e. the first insulation layer 4) deposited on the first substrate 1. A deep silicon etching process in through silicon via technology may be used to process the through silicon via 2 in the first substrate 1. In order to achieve electrical insulation of the metal layer structure 13 of the through silicon via 2 from the first substrate 1, a third insulation layer needs to be deposited on the side wall of the through silicon via 2 before depositing the metal layer structure 13 of the through silicon via 2. In order to achieve the electrical connection between the through silicon via 2 and the metal chassis 6, the second insulation layer 8 at the bottom of the through silicon via 2 needs to be removed by etching and the third insulation layer on the side wall needs to be retained before depositing the metal layer structure 13 in the through silicon via 2; after depositing metal inside the through silicon via 2 and on the surface of the first substrate 1 until the inside of the through silicon via 2 is completely filled and the surface is polished, the metal conductor 5 may be prepared and used as an extended metal electrode (i.e., the second test interface) for the through silicon via 2.

Some of the following embodiments may be understood with reference to FIG. 4, but the accompanying drawings are only illustrative of some of these embodiments and do not constitute a limitation on the embodiments. The through silicon via test structure shown in FIG. 4 may be similar to the through silicon via test structure shown in FIG. 2, with the difference that the first insulation layer 4 shown in FIG. 4 is provided with a lead contact groove 16, and the lead contact groove 16 is provided in correspondence with the second metal lead 15. A metal layer may be deposited in the lead contact groove 16, and the lead contact groove 16 with the metal layer deposited may be electrically connected with the second metal lead 15 and the metal layer structure 13.

The width of the individual surrounding structures illustrated in FIG. 4 may be 3-30 µm.

In some embodiments, when using the device for testing a through silicon via shown in FIG. 4 and testing the leakage current from the through silicon via 2 to a certain surrounding structure 3 using the 4-probe process probe 1 and probe 2 may be inserted on the first test interface 10 corresponding to that surrounding structure 3, and probe 3 and probe 4 may be inserted on the second test interface 12.

It should be noted that an exemplary preparation process for the device for testing a through-hole illustrated in FIG. 4 above is shown below:

The fourth insulation layer 7 may be obtained by electrostatic bonding through silicon-oxygen bonding on the upper surface of the second substrate 14, the metal chassis 6 is prepared, and the second insulation layer 8 may be obtained by similar deposition on the second side of the first substrate 1. The second substrate 14 may be wafer bound to the first substrate 1 by electrostatic bonding. After bonding, one side of the first substrate 1 may be thinned to a target depth for deep silicon etching of the through silicon via by thinning, grinding, chemical mechanical polishing and other processes. The thinned thickness of the first substrate 1 in this embodiment may be 100 µm-300 µm. Then, the first insulation layer 4 may be deposited and etched with the concentric contact groove 9 on the surface of the first substrate 1, and the surrounding structure 3, the first metal lead 11, the second metal lead 15, the first test interface 10 and the second test interface 112 are prepared, followed by the deposition of an insulation layer to protect the surrounding structure 3. Processing the through silicon via 2 in the first substrate 1 using the deep silicon etching process in through silicon via technology, and in order to achieve electrical insulation of the metal layer structure 13 of the through silicon via 2 from the first substrate 1, a third insulation layer needs to be deposited on the side wall of the through silicon via 2 before depositing the metal layer structure 13 of the through silicon via 2; in order to achieve the electrical connection between the through silicon via 2 and the metal chassis 6, it is also necessary to etch away the second insulation layer 8 at the bottom of the through silicon via 2 and retain the third insulation layer on the side wall before depositing the metal layer structure 13 in the through silicon via 2; on the other hand, in order to establish an electrical connection between the metal layer structure 13 around the through silicon via 2 and the second metal lead 15, it is also necessary to etch out the lead contact groove 16 of the second metal lead 15 connected with the second test interface 12. A metal layer may be deposited inside the through silicon via 2 and on the surface of the first substrate 1 until the through silicon via 2 is completely filled and the surface of the metal layer may be polished to prepare the metal conductor 5, which is electrically connected with the second test interface 12 via the second metal lead 15, which is electrically connected with the probe by the second test interface 12.

In conventional technology, there exist devices for testing a through silicon via with a dedicated conductive zone or an additional doping layer inside the wafer substrate, however, the process of preparing the device is more complicated and difficult, and the relationship between the leakage of the sidewall insulation layer and the transmission distance of the through silicon via cannot be obtained. In contrast, the devices for testing a through silicon via shown in FIGS. 1,2,3, and 4 have a simpler structure, which reduces the process complexity compared to the devices for testing a through silicon via with a dedicated conductive zone or an additional doping layer prepared inside the wafer substrate, and enables the acquisition of a sidewall leakage current of the through silicon via as a function of the distance around the structure to the through silicon via, thus enabling a more adequate parameter basis for the development of the through silicon via and circuit layout design rules.

Figure 5:
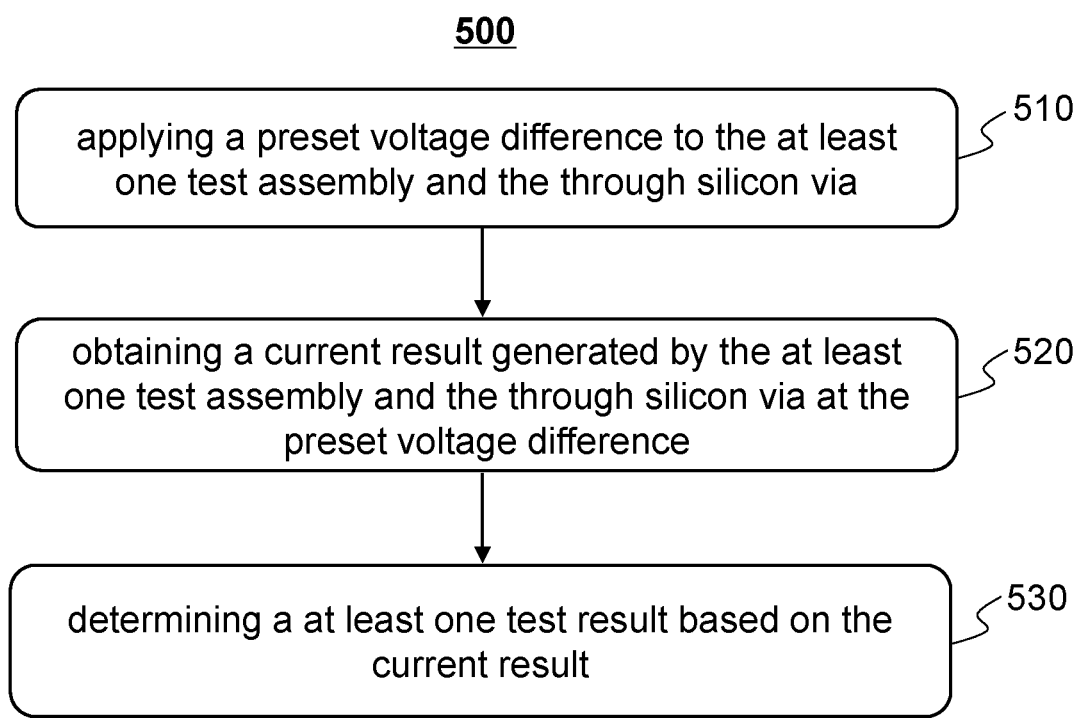
FIG. 5 is a flowchart illustrating an exemplary process for testing a through silicon via according to some embodiments of the present disclosure.

FIG. 5 is a flowchart illustrating an exemplary process for testing a through silicon via according to some embodiments of the present disclosure. In some embodiments, process 500 may be executed by a processor. As shown in FIG. 5, process 500 may include the following steps.

In some embodiments, the processor may be provided in the device for testing a through silicon via, and may also be provided in a separate server. The processor may be used to process data and/or information obtained from the device for testing a through silicon via. The processor may execute program instructions to perform one or more of the functions described in the present disclosure based on such data, information, and/or processing results.

In Step 510, applying a preset voltage difference to the at least one test assembly and the through silicon via.

For more information about the test assembly, the through silicon via, please refer to FIG. 2 and its related description.

The preset voltage difference may be applied based on a power supply. The power supply may include a variety of types, such as, a direct current power supply. In some embodiments, a high voltage may be applied at the through silicon via and a low voltage may be applied at the test assembly by the power supply to create a preset voltage difference. It should be understood that the size of the applied preset voltage difference may be the same for different test assemblies and through silicon vias to be tested in order to be able to accurately measure the sidewall leakage current between the different test assemblies and the through silicon vias to be tested.

The size of the preset voltage difference may be a default value, a preset value, etc.

In some embodiments, one or more probes may be inserted on the surrounding structure of the test assemblies and the metal conductor filled within the through silicon via, respectively, and then the power supply may be controlled to apply a preset voltage difference through the probes to the test assembly and the through silicon via. In some embodiments, one or more probes may be inserted on the first test interface of the test assembly and the metal conductor filled in the through silicon via, respectively, and then the power supply is controlled to apply a preset voltage difference through the probes to the test assembly and the through silicon via. In some embodiments, one or more probes may be inserted on the first test interface of the test assembly and the second test interface connected with the through silicon via, respectively, and then the power supply may be controlled to apply a preset voltage difference to the test assembly and the through silicon via through the probes. For specific embodiments of the applied voltage difference, please refer to FIGS. 1, 2, 3 and 4 and its related descriptions. In step 520, obtaining a current result generated by the at least one test assembly and the through silicon via at the preset voltage difference.

The current result may be a current condition on the loop formed with each test assembly and the through silicon via. For example, the current result may include a magnitude of the current on the loop formed between multiple test assemblies and the through silicon vias to be tested.

In some embodiments, the current result may include at least two current results generated by at least two test assemblies and the through silicon via at the preset voltage difference. The at least two current results may be arranged according to distances of the multiple test assemblies from the through silicon via.

The processor may obtain the current result in using the 4-probe process. For example, a total of 2 probes may be inserted on the second test interface with probe 1 and probe 2, and a total of 2 probes may be inserted on the same surrounding structure 3 or on the first test interface corresponding to that surrounding structure with probe 3 and probe 4. The processor may control the power supply to apply a preset voltage difference through probe 1 and probe 3, and control a current detection device (such as an ammeter) to collect current results through probe 2 and probe 4. For more information about obtaining the current result, please refer to FIG. 1, FIG. 2, FIG. 3 and FIG. 4 and their related descriptions.

In step 530, determining a at least one test result based on the current result.

The test result may be a result used to reflect a relationship between the current in the circuit formed between each test assembly and the through silicon via and a radial distance of the corresponding surrounding structure for that test structure. The test result may have various representations, such as an image, a function, etc.

The processor may determine the magnitude of the current on the circuit formed between the different test components and the through silicon via based on the current results, and then obtain the radial distance of the corresponding surrounding structure for that test assembly through the test device, and plot a graph based on the radial distance of the surrounding structure and the leakage current to obtain the test result.

In some embodiments, the processor may determine a correspondence between the leakage current and the radial distance based on at least two current results, corresponding to the test results.

In some embodiments, the processor may analyze the relationship between the radial distance between the different test components and the through silicon via and the leakage current corresponding to the radial distance, and then, based on the relationship between the radial distance and the leakage current corresponding to the radial distance, obtain the leakage current of the side wall of the through silicon via as a function of the radial distance between the test region and the through silicon via by fitting the curve, which can provide a more adequate parameter basis for the through silicon via and the circuit layout design rules.

In some embodiments of the present disclosure, the magnitude of the leakage current at different radial distances of the through silicon via may be obtained by applying a preset voltage difference, collecting the corresponding current result, and determining a test result based on the current result and the radial distance, which not only achieves accurate measurement of the leakage current of the through silicon via, but also provides a more adequate parameter basis for the through silicon via and the formulation of the design rules of the circuit layout by using the correspondence between the leakage current and the radial distance.

FIG. 6 is a flowchart illustrating another exemplary process for testing a through silicon via according to some embodiments of the present disclosure. In some embodiments, process may be executed by a processor.

In some embodiments, process 600 may be applied to the device for testing a through silicon via as illustrated in FIG. 1. The device for testing a through silicon via may include a semiconductor substrate, which is the first substrate 1 illustrated in FIG. 1, which is provided with a first test region (also referred to as the metal conductor 5) and a second test region (also referred to as the surrounding structure 3), the second test region may be provided around the through silicon via 2 and the first test region, the first test region being a region electrically connected with the inside of the through silicon via 2 or to the side wall thereof. As shown in FIG. 1, the first test region may be a metal conductor electrically connected with the inside of the silicon via 2 or its side wall, and both the first test region and the side wall of the through silicon via 2 may be electrically insulated from the first substrate 1. The first test region illustrated in FIG. 1 may be a metal conductor electrically connected with the inside of the through silicon via 2. The method may include the following steps. As shown in FIG. 6, the process 600 may include the following steps.

In step 610, applying a preset voltage to the first test region and the second test region via the power supply.

In this step, when testing the leakage current, the 4-probe process may be used to test the leakage current, as shown in FIG. 1, probe 1 and probe 2 may be inserted on the first test region for a total of 2 probes, and probe 3 and probe 4 for a total of 2 probes on the second test region in the same ring. The power supply may be a direct current power supply, and the two ends of the direct current power supply are connected with probe 1 and probe 3, and the two ends of the current detection device, for example, an ammeter, are connected with probe 2 and probe 4.

After the two ends of the direct current power supply are connected with probe 1 and probe 3, respectively, the preset voltage may be applied to the second test interface and the surrounding structure.

In step 620, after applying the preset voltage, obtaining a sidewall leakage current from the through silicon via to the second test region.

The current detection device, with probes 2 and 4 connected at each end, may detect the sidewall leakage current from the silicon via hole to be tested to the surrounding structure after applying the direct current voltage.

The sidewall leakage current refers to a leakage current to ground of the through silicon via at a fixed bias voltage. A size of the fixed bias voltage may be equal to the preset voltage.

In conventional technology, a contact window is etched near the through silicon via, and a metal electrode is led from the contact window to test the leakage current from the through silicon via to the contact window. In this case, the leakage current may only be collected in part of the sidewall of the through silicon via, while the leakage current in other regions may be absorbed by the substrate and cannot be collected, which leads to the problem of inaccurate sidewall leakage current in the conventional device for testing a through silicon via.

The method for testing a silicon via hole provided in this embodiment applies a preset voltage to the second test interface and the surrounding structure through the power supply, and after applying the preset voltage, the sidewall leakage current from the silicon via hole to be tested to the surrounding structure is obtained. Since the surrounding structure is provided around the through silicon via and the second test interface, the leakage current from the sidewall of the through silicon via in each direction toward the substrate may be collected through the surrounding structure, improving the accuracy of the sidewall leakage current tested by the device for testing a through silicon via.

It should be noted that the method for testing a through silicon via described above may also be applied to the device for testing a through silicon via as illustrated in FIGS. 2, 3, and 4. As shown in FIGS. 2, 3 and 4, the second test region is annular, arcuate, semi-annular, folded, or polygonal in shape. The second test region only needs to be set around the through silicon via 2, and the embodiments of the present disclosure do not limit the shape of the second test region.

In one of the embodiments, after applying the preset voltage and obtaining the sidewall leakage current from the through silicon via 2 to the second test region, it may further include the following steps:

According to a distance between each second test region and the through silicon via 2 and a sidewall leakage current corresponding to each second test region, a sidewall leakage current result of the through silicon via 2 may be obtained, and the current result may be used to characterize the sidewall leakage current of the through silicon via 2 as a function of the corresponding radial distance. When the second test region is, for example, arc-shaped, semi-ring-shaped, bending-shaped or polygonal, the distance between the second test region and the through silicon via 2 may be taken as an average of a distance from the second test region to a center of a circle of the through silicon via 2. When a center of symmetry of the second test region does not coincide with the center of the circle of the through silicon via 2, a relationship between the sidewall leakage current and the distance of the through silicon via 2 may still be calculated. The calculation method may be a multi-step fitting method, an integration method, etc., or a calculation by taking an average value of the distance from the second test region to the center of the circle of the through silicon via 2. The average distance may be calculated using an arithmetic average, a harmonic average, a geometric average, a squared average, etc.

Based on the distance between each second test region and the through silicon via 2 and the sidewall leakage current corresponding to each second test region, a sidewall leakage current of the through silicon via 2 may be fitted as a function of the distance between the second test region and the through silicon via 2.

In one embodiment, obtaining the sidewall leakage current from the through silicon via 2 to the second test region in step 620 above may be achieved by:

For each second test region, a preset voltage may be applied to each second test region and the through silicon via 2, respectively, to obtain the sidewall leakage current from the through silicon via 2 to each second test region.

For example, as shown in FIG. 1, the device for testing a through silicon via is shown with a total of four second test regions, and the sidewall leakage current from the through silicon via 2 to each second test region may be tested from the inside to the outside in turn. For example, probe A and probe B may be first inserted into the innermost second test region, and probe C and probe D may be inserted into the first test region to test the leakage current from the through silicon via 2 to the innermost second test region using the 4-probe process. After that, probe A and probe B may be inserted on the second test region adjacent to the innermost second test region, and probe C and probe D may be inserted on the first test region, and the leakage current from the through silicon via 2 to the second test region adjacent to the innermost second test region may be tested using the 4-probe process. Similarly, the sidewall leakage current from the through silicon via 2 to each second test region may be tested, and then the sidewall leakage current of the through silicon via 2 may be obtained as a function of the distance between each second test region and the through silicon via 2 and the corresponding sidewall leakage current of each second test region.

In some embodiments, for each second test region, a preset voltage may be applied to the through silicon via 2 and the second test region, respectively, to obtain the sidewall leakage current from the through silicon via 2 to each second test region, which may be achieved by:

For each second test region, a preset voltage may be applied to the through silicon via 2 and the second test region, respectively, to obtain the measured resistance of the through silicon via 2 to each second test region; based on the measured resistance of the through silicon via 2 to each second test region and the preset voltage, the sidewall leakage current of the through silicon via 2 to each second test region may be obtained.

For example, a resistance meter may be used instead of an ammeter, and after applying a preset voltage to the second test region and the through silicon vias 2 to be tested using the power supply, the resistance meter may test the measured resistance from the through silicon via 2 to each second test region, and then obtain the sidewall leakage current from the through silicon via 2 to each second test region based on the measured resistance from the through silicon via 2 to each second test region and the preset voltage. The sidewall leakage current from the through silicon via 2 to the second test region may be equal to a ratio of the preset voltage to the corresponding measured resistance.

In some embodiments, the preset voltage may be constant in the tests with different through silicon vias.

In this embodiment, the preset voltage may be constant in the tests of different through silicon vias, which facilitates the sidewall leakage current of the through silicon vias 2 to be tested to be compared laterally.

In one embodiment, before applying the preset voltage to the first test region and the second test region via the power supply in step 610 above, the following steps may also include the following steps:

The semiconductor substrate is etched to expose semiconductors in the first test region and the second test region.

It should be noted that, as shown in FIGS. 2, 3 and 4, the first insulation layer 4 is deposited on the upper surface of the first substrate 1. Therefore, before applying the preset voltage to the first test region and the second test region via the power supply, the first insulation layer 4 on the semiconductor substrate needs to be etched off to expose the semiconductors in the first test region and the second test region.

If the metal layer structure 13 is deposited in a region corresponding to the first test region of the device for testing a through silicon via, another insulation layer usually needs to be deposited in order to protect the metal layer structure 13. Therefore, an outermost insulation layer on the first substrate 1 also needs to be etched off to expose the metal layer structure 13 before applying the preset voltage to the first test region and the second test region via the power supply.

In some embodiments, after exposing the semiconductors in the first test region and the second test region, it may further include the following steps:

A metal layer is grown on the semiconductor. The conductivity of the metal layer is better than that of the semiconductor, therefore, after exposing the semiconductors in the first test region and the second test region, the metal layer may be produced on the semiconductor, thus facilitating a quick test of the sidewall leakage current of the through silicon via 2.

FIG. 7 is a flowchart illustrating another exemplary process for testing a silicon through-hole according to some embodiments of the present disclosure. In some embodiments, process 700 may be performed by a processor. As shown in FIG. 7, process 700 may include the following steps.

In step 710, applying the preset voltage to the first test region and the second test region through the power supply.

In step 720, after applying the preset voltage to the first test region and one of multiple second test regions, obtaining a sidewall leakage current from the through silicon via to the second test region to which the preset voltage is applied.

In step 730, obtaining a current result for the through silicon via based on a distance between each second test region and the through silicon via and the sidewall leakage current corresponding to each second test region.

Figure 8:
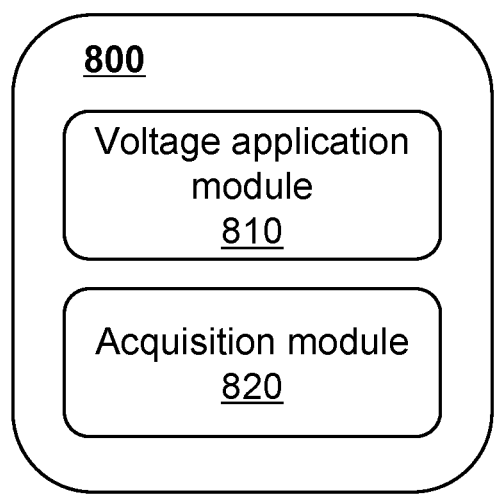
FIG. 8 is a diagram illustrating an exemplary process for testing a through silicon via according to some embodiments of the present disclosure.

FIG. 8 is a diagram illustrating an exemplary process for testing a silicon through-hole according to some embodiments of the present disclosure.

The through silicon via in this embodiment may be provided in the device for testing a through silicon via as described above in FIGS. 1, 2, 3 and 4, the device for testing a through silicon via including a first substrate, a first test region and a second test region provided on the first substrate, the second test region being provided around the through silicon via and the first test region, the first test region being a side wall of the through silicon via or a region electrically connected with the side wall to be tested. The device 800 includes:

A voltage application module 810 used to apply a preset voltage to the first test region and the second test region through the power supply.

An acquisition module 820 used to obtain a sidewall leakage current from the through silicon via to the second test region after the preset voltage is applied.

In one embodiment, the second test region may include a variety of shapes, such as a ring, an arc, a semi-ring, a folded shape, or a polygon.

In one embodiment, the second test region may be co-circular with the through silicon via.

In one embodiment, a count of second test regions may be multiple, with each second test region having a different distance from the through silicon via.

In one embodiment, the acquisition module 820 may also be used to obtain a current result for the through silicon via based on the distance between each second test region and the through silicon via and the corresponding sidewall leakage current of each second test region, the current result may be used to characterize the sidewall leakage current of the through silicon via as a function of the corresponding distance.

In one embodiment, the above-described acquisition module 820 may be specifically used to apply the preset voltage to the through silicon via and the second test region, respectively, for each second test region, to obtain the sidewall leakage current from the through silicon via to each second test region.

In one embodiment, the preset voltage may be constant across different tests of the through silicon vias to be tested.

The individual modules in the above device for testing a through silicon via may be implemented in whole or in part by software, hardware and combinations thereof. Each of the above modules may be embedded in hardware form in or independent of the processor in the computer device, or may be stored in software form in memory in the computer device so that the processor can be called to perform the operations corresponding to each of the above modules.

Figure 9:
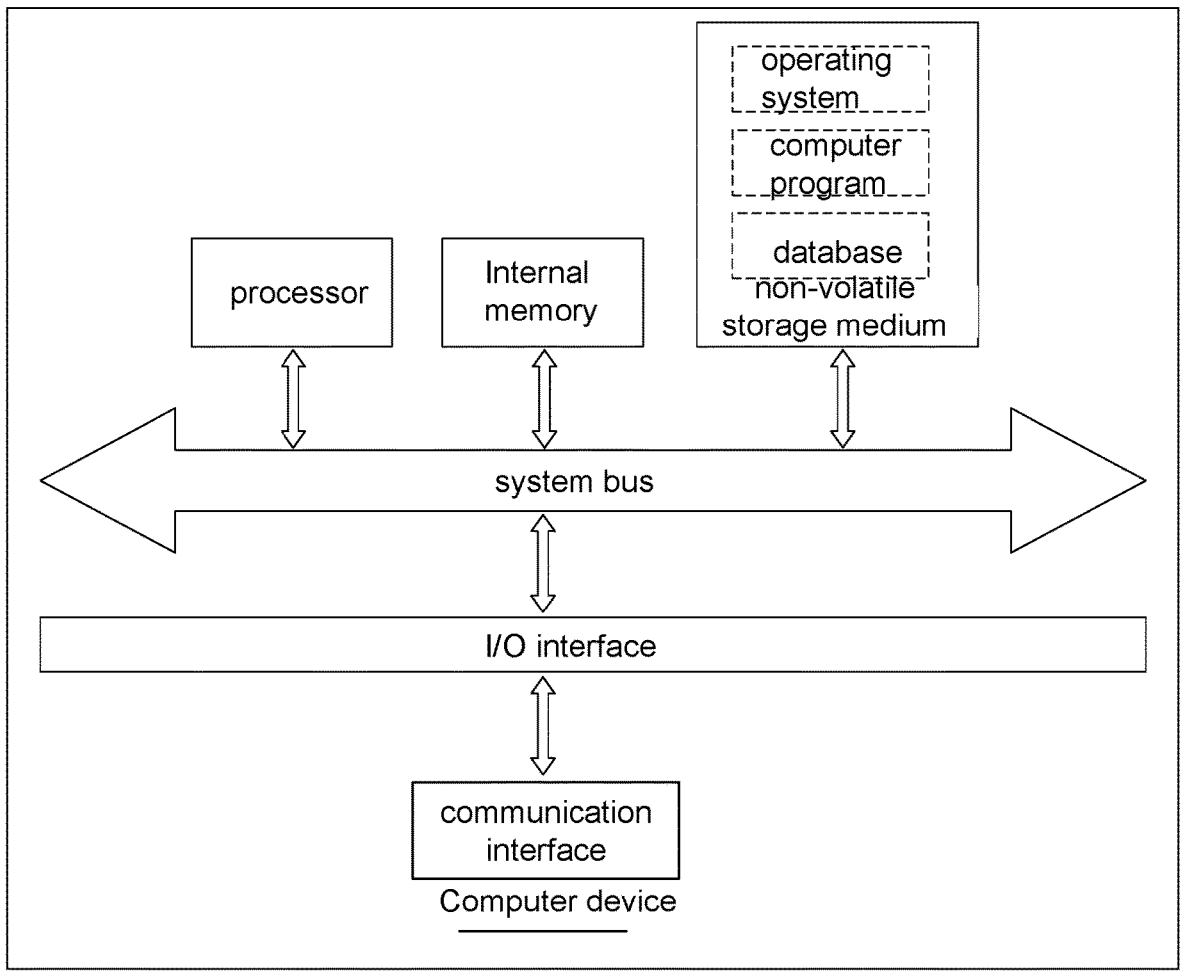
FIG. 9 is a diagram illustrating an exemplary computer device according to some embodiments of the present disclosure.

FIG. 9 is a diagram illustrating an exemplary computer device according to some embodiments of the present disclosure. In one embodiment, a computer device may be provided, which may be a terminal, as shown in FIG. 9, which may include a processor connected via a system bus, a memory, a communication interface, a display, and an input device. The processor of the computer device may be used to provide computing and control capabilities. The memory of the computer device may include a non-volatile storage medium, an internal memory. The non-volatile storage medium may store an operating system, a computer program, and a database. The internal memory may provide an environment for operation of the operating system and the computer program in the non-volatile storage medium. The communication interface of the computer device may be used to communicate with an external terminal by wired or wireless means, which may be implemented by a wireless fidelity (WIFI), a mobile cellular network, a near field communication (NFC), or other technologies. The computer program when executed by the processor to implement the method for testing a through silicon via as described in any of the above embodiments.

It can be understood by those skilled in the art that the structure illustrated in FIG. 9, which is only a block diagram of a portion of the structure associated with the scheme of the present disclosure, does not constitute a limitation of the computer device to which the scheme of the present disclosure is applied, and that a specific computer device may include more or fewer components than shown in the figures, or combine certain components, or have a different arrangement of components.

In one embodiment, there is provided a computer device including a memory and a processor, a computer program stored in the memory, the processor executing the computer program to implement the method for testing a through silicon via described in any of the above embodiments.

In one embodiment, there is provided a computer-readable storage medium having a computer program stored thereon, the computer program when executed by a processor implements the method for testing a through silicon via described in any of the above embodiments.

In one embodiment, there is provided a computer program product including a computer program that when executed by a processor implements the method for testing a through silicon via described in any of the above embodiments.

The basic concepts have been described above, apparently, in detail, as will be described above, and does not constitute limitations of the disclosure. Although there is no clear explanation here, those skilled in the art may make various modifications, improvements, and modifications of present disclosure. This type of modification, improvement, and corrections are recommended in present disclosure, so the modification, improvement, and the amendment remain in the spirit and scope of the exemplary embodiment of the present disclosure.

At the same time, present disclosure uses specific words to describe the embodiments of the present disclosure. As "one embodiment", "an embodiment", and/or "some embodiments" means a certain feature, structure, or characteristic of at least one embodiment of the present disclosure. Therefore, it is emphasized and should be appreciated that two or more references to "an embodiment" or "one embodiment" or "an alternative embodiment" in various parts of present disclosure are not necessarily all referring to the same embodiment. Further, certain features, structures, or features of one or more embodiments of the present disclosure may be combined.

Moreover, unless the claims are clearly stated, the sequence of the present disclosure, the use of the digital letters, or the use of other names is not configured to define the order of the present disclosure processes and methods. Although some examples of the disclosure currently considered useful in the present disclosure are discussed in the above disclosure, it should be understood that the details will only be described, and the appended claims are not limited to the disclosure embodiments. The requirements are designed to cover all modifications and equivalents combined with the substance and range of the present disclosure. For example, although the implementation of various components described above may be embodied in a hardware device, it may also be implemented as a software only scheme, e.g., an installation on an existing server or mobile device.

Similarly, it should be noted that in order to simplify the expression disclosed in the present disclosure and help the understanding of one or more embodiments, in the previous description of the embodiments of the present disclosure, a variety of features are sometimes combined into one embodiment, drawings or description thereof. However, this disclosure method does not mean that the characteristics required by the object of the present disclosure are more than the characteristics mentioned in the claims. Rather, claimed subject matter may lie in less than all features of a single foregoing disclosed embodiment.

In some embodiments, numbers expressing quantities of ingredients, properties, and so forth, configured to describe and claim certain embodiments of the application are to be understood as being modified in some instances by the term "about," "approximate," or "substantially". Unless otherwise stated, "approximately", "approximately" or "substantially" indicates that the number is allowed to vary by ±20%. Accordingly, in some embodiments, the numerical parameters used in the specification and claims are approximate values, and the approximate values may be changed according to characteristics required by individual embodiments. In some embodiments, the numerical parameters should be construed in light of the number of reported significant digits and by applying ordinary rounding techniques. Although the numerical domains and parameters used in the present disclosure are configured to confirm its range breadth, in the specific embodiment, the settings of such values are as accurately as possible within the feasible range.

For each patent, patent application, patent application publication and other materials referenced by the present disclosure, such as articles, books, instructions, publications, documentation, etc., hereby incorporated herein by reference. Except for the application history documents that are inconsistent with or conflict with the contents of the present disclosure, and the documents that limit the widest range of claims in the present disclosure (currently or later attached to the present disclosure). It should be noted that if a description, definition, and/or terms in the subsequent material of the present disclosure are inconsistent or conflicted with the content described in the present disclosure, the use of description, definition, and/or terms in this manual shall prevail.

Finally, it should be understood that the embodiments described herein are only configured to illustrate the principles of the embodiments of the present disclosure. Other deformations may also belong to the scope of the present disclosure. Thus, as an example, not limited, the alternative configuration of the present disclosure embodiment may be consistent with the teachings of the present disclosure. Accordingly, the embodiments of the present disclosure are not limited to the embodiments of the present disclosure clearly described and described.

What is claimed is:

1. A device, comprising:
a substrate being provided with a through silicon via;
at least one test assembly used to determine a test result reflecting a relationship between a sidewall leakage current in a circuit formed between each test assembly and the through silicon via and a radial distance of the test assembly, each of the at least one test assembly including a surrounding structure, the surrounding structure being arranged around the through silicon via.

2. The device of claim 1, wherein the test assembly further includes a test interface, the surrounding structure includes an opening structure, the test interface passes through the opening structure.

3. The device of claim 2, wherein a count of the test assemblies is multiple, the multiple test assemblies include at least two test assemblies, a difference in opening angles of any two of the at least two surrounding structures is not greater than 30°, the opening angle being an angle formed by a line between endpoints of ends of the opening structure and a center of a upper side of the through silicon via, the upper side of the through silicon via being a side close to the first substrate.

4. The device of claim 2, wherein the test interface is electrically connected with the surrounding structure by means of a first metal lead, the first metal lead being led from the opening structure.

5. The device of claim 1, wherein a first side of the first substrate includes a first insulation layer; the surrounding structure is provided in the first insulation layer and is electrically connected with the first substrate at the first side.

6. The device of claim 5, wherein the first insulation layer includes a contact groove; the surrounding structure includes a conduction region, the conduction region being provided within the contact groove.

7. The device of claim 5, wherein a count of the test assemblies is multiple, the multiple test assemblies include at least two test assemblies, the at least two test assemblies corresponding to at least two surrounding structures being disposed at radial intervals in the first insulation layer.

8. The device of claim 7, wherein the at least two surrounding structures are arranged coaxially around the through silicon via.

9. The device of claim 7, wherein at least a portion of the at least two surrounding structures in the first insulation layer differ in height along an axial direction of the through silicon via.

10. The device of claim 9, wherein, among multiple surrounding structures with different heights along the axial direction of the through silicon via, a difference in opening angles between a surrounding structure with a larger radial dimension and a surrounding structure with a smaller radial dimension is not greater than 5°.

11. The device of claim 9, wherein a height of one of the at least two surrounding structures is positively correlated to the distance between the one of the at least two surrounding structures and the through silicon via.

12. The device of claim 7, wherein a distance between adjacent surrounding structures of the at least two surrounding structures along a radial direction of the through silicon via is between 20 μm and 200 μm.

13. The device of claim 7, wherein a size of a cross-sectional area of one of the at least two surrounding structures is positively correlated with a distance between the one of the at least two surrounding structures and the through silicon via.

14. The device of claim 7, wherein the at least two surrounding structures have the same height; a radial width of one of the at least two surrounding structures is positively correlated to the distance between the one of the at least two surrounding structures and the through silicon via.

15. The device of claim 7, wherein a maximum distance between the one of the at least two surrounding structures and the through silicon via is related to at least one of a diameter of the through silicon via and a performance of the through silicon via.

16. The device of claim 1, wherein a second side of the first substrate includes a second insulation layer; the through silicon via includes a metal layer structure and a second test interface electrically connected with the metal layer structure; the metal layer structure forms a side wall of the through silicon via and penetrates the second insulation layer, the metal layer structure being electrically separated from the first substrate by a third insulation layer.

17. The device of claim 1, wherein the second substrate has a fourth insulation layer deposited on the upper surface of the second substrate, an edge region of the metal chassis is in contact with the fourth insulation layer, and the fourth insulation layer is used to achieve an electrical separation between the metal chassis and the second substrate.

18. A method implemented on a device, the device including a substrate being provided with a through silicon via and at least one test assembly, each of the at least one test assembly including at least one surrounding structure and a test interface, the surrounding structure arranged around the through silicon via, wherein the surrounding structure includes an opening structure, the test interface passes through the opening structure; the method comprising:
applying a voltage difference to the at least one test assembly and the through silicon via;
obtaining a current result generated by the at least one test assembly and the through silicon via at the voltage difference;
determining at least one test result based on the current result.

19. The method of claim 18, wherein the at least one test assembly includes at least two test assemblies, and the at least one current result includes at least two current results generated by the at least two test assemblies and the through silicon via at the voltage difference; the determining at least one test result based on the current result includes:
determining a correspondence between a leakage current and a radial distance of the through silicon via based on the at least two current results, the correspondence being the test result.

20. A system, comprising:
at least one storage medium including a set of instructions;
at least one processor in communication with the at least one storage medium, wherein when executing the set of instructions, the at least one processor is directed to cause the system to perform operations including:
applying a voltage difference to at least one test assembly and a through silicon via on a substrate; each of the at least one test assembly including at least one surrounding structure and a test interface, the surrounding structure arranged around the through silicon via, wherein the surrounding structure includes an opening structure, the test interface passes through the opening structure;
obtaining a current result generated by the at least one test assembly and the through silicon via at the voltage difference;
determining at least one test result based on the current result.

* * * * *